United States Patent Office 3,085,107
Patented Apr. 9, 1963

3,085,107
CYCLODODECYLACETIC ACID ESTERS, DERIVATIVES THEREOF AND INTERMEDIATES THEREFOR
Pierre Lafont, Lyon, and Yannik Bonnet, Tassin-la-Demi-Lune, France, assignors to Societe des Usines Chimiques Rhone-Poulenc, Paris, France, a French body corporate
No Drawing. Filed Nov. 17, 1961, Ser. No. 153,217
Claims priority, application France Nov. 28, 1960
6 Claims. (Cl. 260—468)

This invention relates to a new class of organic chemical compounds which are the cyclododecyl acetic acid esters, to the corresponding acid, to the production of the esters and to intermediates for use in the production of the esters.

According to a first feature of the present invention there are provided, as new chemical compounds, esters of cyclodecylacetic acid of the Formula I:

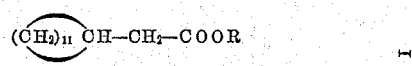

wherein R represents an alkyl group containing from 1 to 5 carbon atoms.

According to a further feature of the invention there is provided a process for the production of an ester of Formula I which comprises subjecting to catalytic hydrogenation an alkyl cyclododec-1-enyl acetate of which the alkyl group contains 1 to 5 carbon atoms.

According to a still further feature of the invention there is provided a process for the production of an ester of Formula I which comprises subjecting an alkyl 1-hydroxy-cyclododecyl acetate of which the alkyl group contains 1 to 5 carbon atoms to treatment with a dehydrating agent to produce a mixture of isomeric alkyl cyclododec-1-enyl acetates and subjecting that mixture to catalytic hydrogenation.

According to a still further feature of the invention there is provided a process for the production of an ester of Formula I which comprises reacting cyclododecanone in the presence of zinc with an alkyl α-bromoacetate of which the alkyl group contains 1 to 5 carbon atoms, hydrolysing the product by treatment with aqueous sulphuric acid, subjecting the alkyl-1-hydroxycyclododecyl acetate thus formed to treatment with a dehydrating agent, isolating a mixture of isomeric alkyl cyclododec-1-enyl acetates thus formed and subjecting them to catalytic hydrogenation.

Referring in greater detail to these processes, the alkyl (1-hydroxycyclododecyl) acetates of the general Formula II:

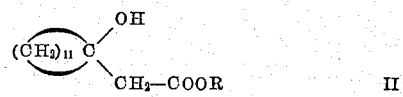

are first prepared by condensation of cyclododecanone with alkyl alpha-bromoacetates, of the formula $BrCH_2$—COOR, in the presence of zinc, under the usual conditions for the performance of the Reformatzky reaction [Berichte, vol. 20, p. 1210 (1887)]. This reaction takes place with very good yields.

The beta-hydroxy esters obtained are thereafter subjected to dehydration by methods known for esters of this type, for example by means of phosphorus oxychloride in the presence of an organic base such as, for example, pyridine, or by distillation in vacuo in the presence of 1–5% by weight of para-toluenesulphonic acid. There is thus obtained a mixture of stereoisomeric esters having a double endocyclic bond, of the general Formula III:

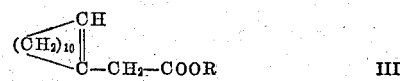

in which R has the meaning previously given.

By hydrogenation by the usual methods of hydrogenation of cycloalkenic compounds having an ester function, for example in the presence of Raney nickel or in the presence of platinum in an acetic acid medium, the esters of Formula III are converted into cyclododecylacetic esters.

Some of the esters of Formula I can be obtained by trans-esterification from other esters of the same group. For example, n-butyl-cyclododecylacetate may be obtained by the action of n-butyl alcohol on methylcyclododecylacetate with elimination of the methyl alcohol. It is also possible to prepare cyclododecylacetic acid by saponification of an ester of Formula I and to produce all the other esters from this acid by esterification with the appropriate alcohol.

The compound cyclododecylacetic acid, and the intermediates of Formulae II and III are novel compounds per se and constitute further features of the present invention.

The products of the invention have general value as starting materials in the synthesis of other organic compounds. The esters, and more especially methylcyclododecylacetate and ethyl cyclododecylacetate, have odours in particular ranges, by reason of which they can be used as basic products for perfumery. For example, the methyl ester has a woody and rosy fragrance with a spicy tinge. When tested in a rose having no special characteristic, it orients it towards the Bulgarian rose, giving it more power and vitality. Moreover, it has high clinging fragrance.

The following examples will serve to illustrate the invention:

Example I (A) Into a 500 cc. spherical flask provided with a condenser, a dropping funnel and a stirrer are successively introduced 9.8 g. of zinc turnings, 18.2 g. of cyclododecanone and 110 cc. of anhydrous benzene. The mixture is brought to boiling point, a little benzene being removed to ensure good drying of the apparatus and its contents. A light reflux is maintained and 22 g. of ethyl alpha-bromoacetate are run in drop-by-drop in one hour. At the end of the running-in, the boiling is maintained with stirring for 10 hours. The flask is then cooled in an ice bath and its contents, which are of pasty appearance, are hydrolysed with 100 cc. of 10% sulphuric acid, added drop-by-drop. The organic layer is decanted and washed with water and then dried over anhydrous sodium sulphate, and the solvent is evaporated. There are thus obtained 25.9 g. of crude ethyl (1-hydroxycyclododecyl)-acetate which, on distillation in vacuo, gives 22.6 g. of a middle fraction distilling at 116–120° C. under 0.12 mm. Hg and crystallising on cooling to give pure ethyl (1-hydroxycyclododecyl)acetate, M.P. 55° C. (yield 83.7% calculated on the cyclododecanone).

(B) Into an apparatus identical to that previously described are introduced 22 g. of crude ethyl (1-hydroxycyclododecyl)acetate, which is dissolved in 50 cc. of pyridine. The product is cooled in an ice bath to 0° C., 13 g. of phosphorus oxychloride are gradually added in 10 minutes and the mixture is allowed to stand for 4 hours at room temperature. It is then poured into acidulated water to remove the pyridine.

The reaction mass is extracted with diethyl ether and then dried, and the solvent is evaporated. There are thus recovered 19.4 g. of a crude ester which, on distillation in vacuo, gives 15.6 g. of a middle fraction boiling at 108–

114° C. under 0.13 mm. Hg, and consisting of a mixture of the two isomers having a double endocyclic bond of the ester of the formula:

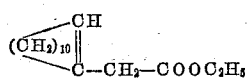

This ester is also obtained in a good yield by distillation under 30 mm. Hg of ethyl (1-hydroxycyclododecyl)-acetate in the presence of 2% by weight of para-toluenesulphonic acid.

(C) Into a hydrogenation flask are introduced 14.5 g. of ethylcyclododec-1-enyl acetate obtained as stated under (B), 75 cc. of acetic acid and then 150 mg. of finely divided Adams platinum, and hydrogen is passed therethrough for 2 hours at room temperature (20° C.). The product is thereafter filtered, the acidity of the filtrate is neutralised by the addition of anhydrous sodium carbonate, the reaction product is extracted with diethyl ether, the ethereal solution is washed with water, the product is dried and the ether is evaporated. The residue is then distilled in vacuo. There are obtained 12.8 g. of a middle fraction having a boiling point of 121–126° C. under 0.10 mm. Hg, consisting of ethyl cyclododecylacetate.

By saponifying 10 g. of ethyl cyclododecylacetate by heating under reflux with 100 cc. of 10% potassium hydroxide solution in methanol, and then acidifying the product after elimination of the mixture of alcohols formed, there are obtained 8.4 g. of cyclododecylacetic acid which, on recrystallisation from a mixture of ether and petroleum ether (35–50° C. fraction), melts at 97°C.

*Example II*

The operation is carried out under exactly the same conditions as in Example I, part (A), but the ethyl alpha-bromoacetate is replaced by the corresponding methyl ester.

Starting with:

145.6 g. of cyclododecanone
159 g. of methyl apha-bromoacetate
67.8 g. of zinc chips
700 cc. of anhydrous benzene there are obtained, after the final distilling and crystallising operations, 184.4 g. of methyl (1-hydroxycyclododecyl)acetate, which melts at 75° C. (yield about 90%).

The dehydration of 137.5 g. of this ester by distillation under 30 mm. Hg in the presence of 2% by weight of para-toluenesulphonic acid gives 80.2 g. of a mixture of isomers of the unsaturated ester of the formula:

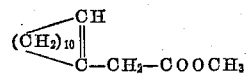

distilling at 141–143° C. under 5 mm. Hg.

Finally, by hydrogenation in the presence of Raney nickel with the following quantities of reactants:

15 g. of methyl cyclododecenylacetate
5 g. of Raney nickel
50 cc. of methanol there are obtained in the final distillation 13.2 g. of methyl cyclododecyl acetate (yield 87.2%), M.P. 159–162° C. under 9 mm. Hg.

The hydrogenation of 55 g. of methyl cyclododec-1-enyl acetate as indicated in Example I, part (C), in the presence of 1.2 g. of Adams platinum, in 200 cc. of glacial acetic acid, for 3 hours at 20–25° C., followed by extraction with ether of the mixture obtained, gives a liquid which, on distillation in vacuo, gives 46.3 g. of methyl cyclododecyl acetate.

This methyl cyclododecylacetate was also prepared by esterification of the cyclododecylacetic acid obtained as stated in Example I. For this purpose, there is heated under reflux for 16 hours a solution of 20 g. of cyclododecylacetic acid in 200 cc. of anhydrous methanol with 20 g. of concentrated sulphuric acid, and then, after evaporation of the excess of methanol in vacuo, the product is poured into water and extracted with ether, the ethereal extract is dried over anhydrous sodium sulphate, the ether is driven off and the product is distilled in vacuo. There is thus obtained a middle fraction consisting of methyl cyclododecylacetate, M.P. 106.5° C. under 0.32 mm. Hg.

We claim:
1. An ester of cyclododecylacetic acid of the formula:

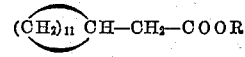

wherein R is alkyl of 1 to 5 carbon atoms.
2. Methyl cyclododecylacetate.
3. Ethyl cyclododecylacetate.
4. An alkyl 1-hydroxycyclododecyl acetate of the formula:

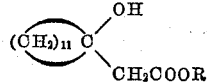

where R is alkyl of 1 to 5 carbon atoms.
5. An alkyl cyclododec-1-enyl acetate of the formula:

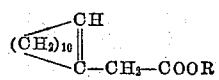

where R is alkyl of 1 to 5 carbon atoms.
6. Cyclododecyl acetic acid.

References Cited in the file of this patent

Wagner et al.: Synthetic Organic Chemistry (New York, 1953), pages 177, 493, 32–35.